TAPE TRANSPORTING MECHANISM

Filed April 16, 1956 5 Sheets-Sheet 1

Inventor
Rubin Shatavsky
By Silverman & Mullin
Attorneys

March 8, 1960 R. SHATAVSKY 2,927,743

TAPE TRANSPORTING MECHANISM

Filed April 16, 1956 5 Sheets-Sheet 2

Inventor
Rubin Shatavsky
By Silverman + Mullin
attorneys

March 8, 1960 R. SHATAVSKY 2,927,743

TAPE TRANSPORTING MECHANISM

Filed April 16, 1956 5 Sheets-Sheet 3

Inventor
Rubin Shatavsky
By Silverman + Mullin
attorneys

March 8, 1960 R. SHATAVSKY 2,927,743

TAPE TRANSPORTING MECHANISM

Filed April 16, 1956 5 Sheets-Sheet 4

Inventor
Rubin Shatavsky
By Silverman + Mullin
Attorneys

TAPE TRANSPORTING MECHANISM

Filed April 16, 1956 5 Sheets-Sheet 5

Inventor
Rubin Shatavsky
By Silverman + Mullin
Attorneys

United States Patent Office 2,927,743

Patented Mar. 8, 1960

2,927,743

TAPE TRANSPORTING MECHANISM

Rubin Shatavsky, Park Forest, Ill., assignor to Sound, Inc., Chicago, Ill.

Application April 16, 1956, Serial No. 578,222

14 Claims. (Cl. 242—55.12)

This invention relates generally to a tape transporting mechanism and more particularly is concerned with a mechanism for use with flexible recording mediums such as tape or wire which have magnetized particles dispersed thereon used for the recording and reproduction of sound or television or other intelligence.

The usual device, known as a tape recorder, has a pair of spindles for supporting reels of the recording medium which, for illustrative purposes may be considered acetate or other cellulose tape having ferric oxides applied thereto which is readily capable of being magnetized permanently. The tape is threaded past electromagnetic means in the form of a magnetic circuit of paramagnetic material energized by suitable windings to produce a very narrow field through which the tape passes. Mechanism is provided for moving the tape at uniform speeds past the electromagnetic means, known as a "head."

If the head is energized by the windings, the particles along the tape will be magnetized in accordance with the variation of flux in the magnetic circuit. The windings may be the output of some source of suitable modulated signals in any well-known manner. Under these circumstances the modulations will be recorded on the tape as variations in magnetization. When the magnetized tape is passed in the vicinity of the head, and the head is not energized externally but instead froms the input to an amplifier, for example, the magnetization on the tape will induce flux in the magnetic circuit and hence will cause current to flow in the windings which is modulated in accordance with the said magnetization.

The usual device has means for driving the tape, means for winding the tape in one direction on one reel and winding the tape in the opposite direction upon the other reel. Means must be provided for maintaining the tape taut during recording and during reproducing, as well as means to prevent spill-over on wind or re-wind. Means are provided for achieving different speeds of record and reproduce. Other mechanisms are provided for various other purposes, such as, for example, pressing the tape against the poles of the heads, and the like.

The tape transporting mechanism of this invention has structure for accomplishing the purposes described above, but the important objects of the invention are to provide structure and means for achieving these functions which are simple to manufacture, assemble and adjust and which are highly economical due to the novel construction and small number of parts thereof; to provide new and improved structures for accomplishing the various functions which have not heretofore been used for the accomplishment of such functions; to provide a tape transporting mechanism which has a minimum of moving parts of simple structure; to provide a tape transport mechanism which occupies a small volume due to compactness and the utilization of multiple functions for single means; and to provide a tape transporting mechanism which is durable and not likely to break or become misadjusted.

Other objects of the invention lie in the provision of novel means for transferring the rotation of the motor to the reel spindles; the provision of a novel speed change mechanism; the provision of novel control means for achieving the functions of record or reproduce, wind and rewind which include a single control lever which is moved to any one of three positions.

Many other objects will occur to those skilled in the art of tape transporting mechanisms as a detailed description of the invention proceeds, in connection with which there has been illustrated a preferred embodiment thereof in accordance with the requirements of the patent laws. The invention is applicable to tape transporting mechanisms which are associated with amplifiers and similar apparatus in a housing to provide the so-called tape recorder, and as well to systems wherein the mechanism is merely mounted in a rack or chassis along with other equipment for use in entertainment, telemetering, instrumentation and the like, the latter use being termed use as a "deck."

The drawings illustrate the preferred embodiment, and the several figures thereof are as follows.

Figures 1, 5:
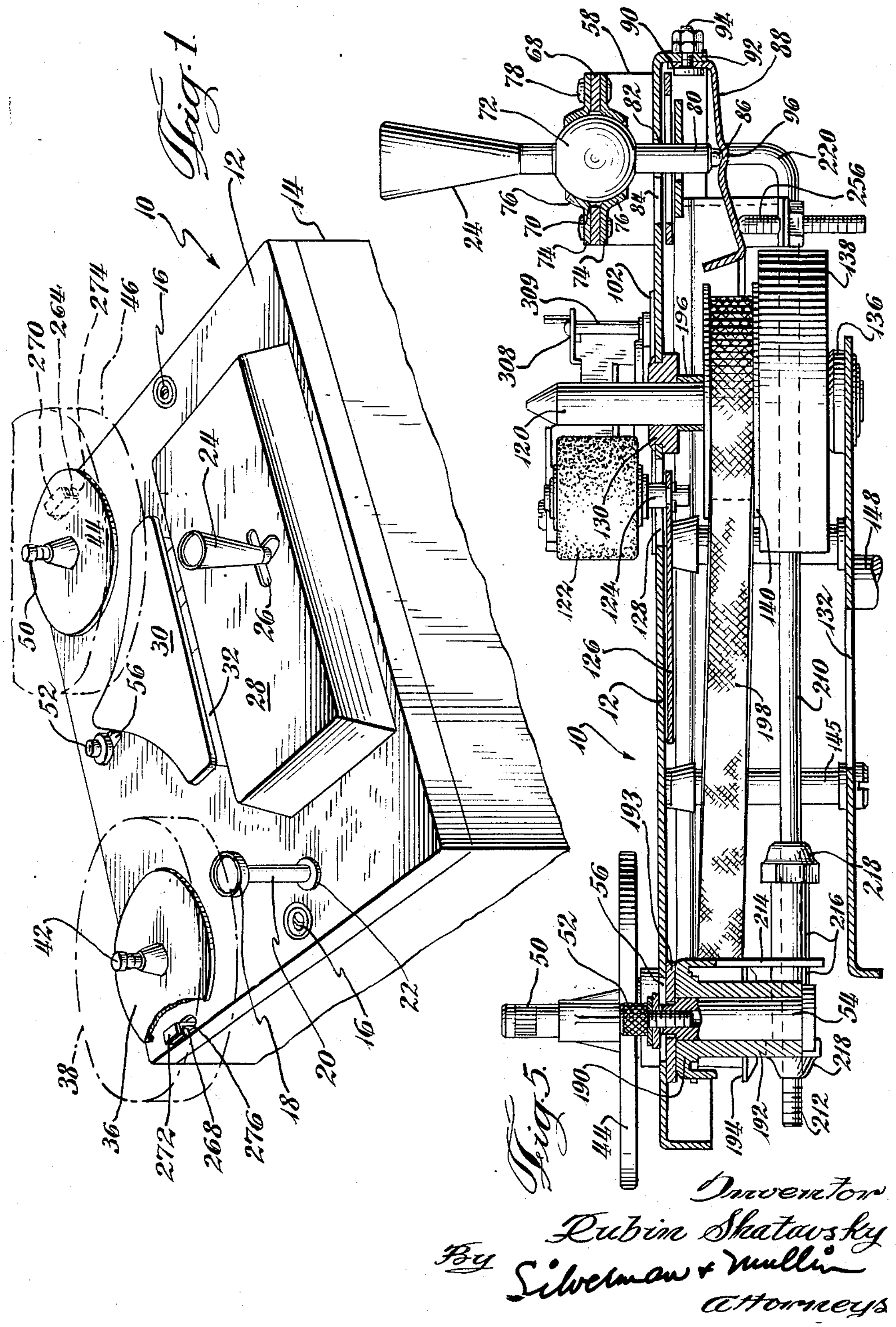
Fig. 1 is a perspective view of a housing mounting a tape transporting mechanism thereon, which mechanism is constructed in accordance with the invention herein.
Fig. 5 is a sectional view through the mechanism generally along the line 5—5 of Fig. 2 and in the direction indicated.

The tape transporting mechanism is designated generally by the reference character 10 and as shown in Fig. 1, the entire mechanism is mounted on a metal chassis or plate 12 which can be associated with other auxiliary apparatus. In Fig. 1 the mechanism plate 12 is mounted on a suitable housing 14 in any desired manner, such as for example by the use of screws 16. Various means for controlling the electrical apparatus associated with the mechanism have not been shown. These might include a treble control for an amplifier, volume control, jacks for inputs and outputs, and the like. No switch for energizing the electric motor operating the transporting mechanism is shown because this switch will usually be associated with either the treble or volume control.

The external appearance of the device is substantially as shown in Fig. 1. Visible are: the speed change control knob 18 which is mounted on a rotatable and reciprocable shaft 20 which passes through the plate 12 to the bottom thereof by way of a bushing 22; the main control knob 24 which extends through a T-shaped slot 26 in the cover plate 28 which protects certain parts of the mechanism; the rear cover plate 30 which is spaced from the cover plate 28 to provide a straight line slot 32 through which the tape 34 (shown in solid lines in Fig. 2) is threaded; the take-up reel rest 36 which mounts a take up reel 38 (broken lines) and which in turn is mounted on a take up spindle 48 (Fig. 4) by means of a cap 42, being rotatable with the spindle 48; a feed reel rest 44 which mounts a feed reel 46 (broken lines) and is in turn mounted on a feed reel spindle 40 (Fig. 4) by means of the cap 50, being rotatable with the spindle 40; and an adjusting screw 52 which is secured to the upper end of the equalizer bar pivot stud 54 (Fig. 3) and extends through a slot 56 in the plate 12 for a purpose to be described. Normally the adjusting screw 52 will be covered by an ornamental cap which is not shown.

Figure 2:
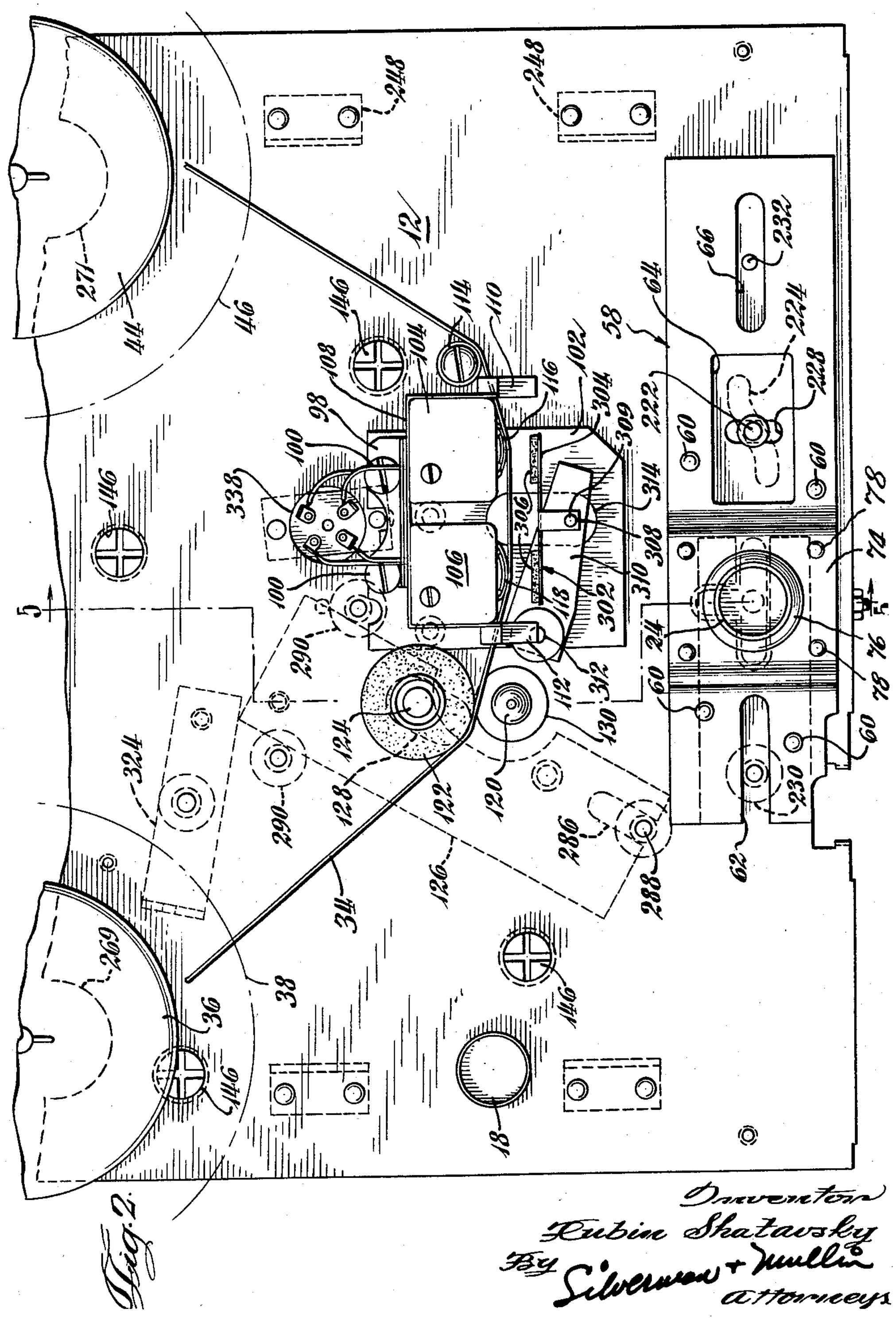
Fig. 2 is a fragmentary top plan view of a structure suitable for association with a housing as in Fig. 1 but with the cover members removed to show the details of the structure.

Attention is now invited to Fig. 2 which is a plan view of the mechanism with the cover plates 28 and 30 removed. At the front of the plate 12 there is a control support member 58 which is in the form of an elongate metal plate riveted to the top of the mechanism plate 12 as at 60 and having various slots and cutaway portions 62, 64 and 66 to enable other elements and structure to be mounted on the bottom of the chassis plate 12 in the vicinity of the main control knob 24. The support member 58 has an upwardly offset integral platform section 68 which has an aperture 70 of sufficient diameter to clear a ball 72 (Fig. 5) centered therein and permanently secured in place by upper and lower ball retainer plates 74 each having annular spherical flanges 76 together defining a socket within which the ball may be partially rotated. The plates 74 are riveted top and bottom of the platform section 68 as at 78.

The main control knob 24 is secured in the center of the ball 72 and a control shaft 80 extends from the bottom of the ball 72 through a T-shaped slot 82 which has the center leg 84 extending rearward instead of forward as in the case of the slot 26. The lower end of the control shaft 80 has a ball 86 set thereinto or formed thereon adapted to engage and ride upon a large leaf spring 88 which is mounted by its front edge 90 to the front flange 92 of the chassis plate 12, but only at its center, by means of a bolt 94. Spring 88 has an indentation 96 at its center adapted to seat the ball 86 in neutral position. This is shown in Fig. 5.

Other structure seen in Fig. 2 comprise the various means operating upon the tape to drive the same or press the same against the heads. A head bracket 98 is mounted to the plate 12 by screws 100 with an interposed shield member 102. Shown are an erase head 104 on the right and a reproduce-record head 106 on the left, suitably secured to the bracket 98. A U-shaped member 108 is also mounted to the bracket and same provides right and left tape guides at 110 and 112 to properly position the tape above the surface of the plate 12 relative the poles of the heads.

The tape 34 is threaded from the feed reel 46 around a post 114 through the right hand tape guide 110 past the pole piece 116 of the head 104 and the pole piece 118, through the left tape guide 112 and between the drive capstan 120 and the pressure roller 122 to the take-up reel 38. The pressure roller 122 is of some resilient material such as rubber or the like and is mounted for idling rotation on a shaft 124 which is mounted upon and bodily movable with a slide plate 126 which moves in a plane upon the bottom surface of and parallel with the chassis plate 12, as will be described. The shaft 124 extends through a slot 128 in the chassis plate 12, so that when the apparatus is to be used for recording or reproducing and it is desired to move the tape 34 at a predetermined speed past the pole pieces 116 and 118, the pressure roller 122 may be moved against the drive capstan 120 to seize the tape between them. On winding or re-winding the tape, the pressure roller 122 is spaced from the drive capstan 120.

The drive capstan 120 is journalled for rotation in the plate 12 by suitable bearing means 130 and in a sub-chassis 132 (which provides a support for a motor 134) by means of another bearing 136. A flywheel 138 having an integral reduced diameter pulley 140 is affixed to the capstan 120 but located below the plate 12. The motor 134 is mounted below the sub-chassis 132 in any suitable manner, as for example by a shock-mounted plate 142, supported by three posts 144 shown in section in Fig. 4. The sub-chassis in turn is mounted on spacers 145 extending from the bottom of the plate 12. The ends of the spacers are peened in suitable openings provided in the plate and may be seen at 146 from the top of the device 10 in Fig. 2.

Figures 6, 7:
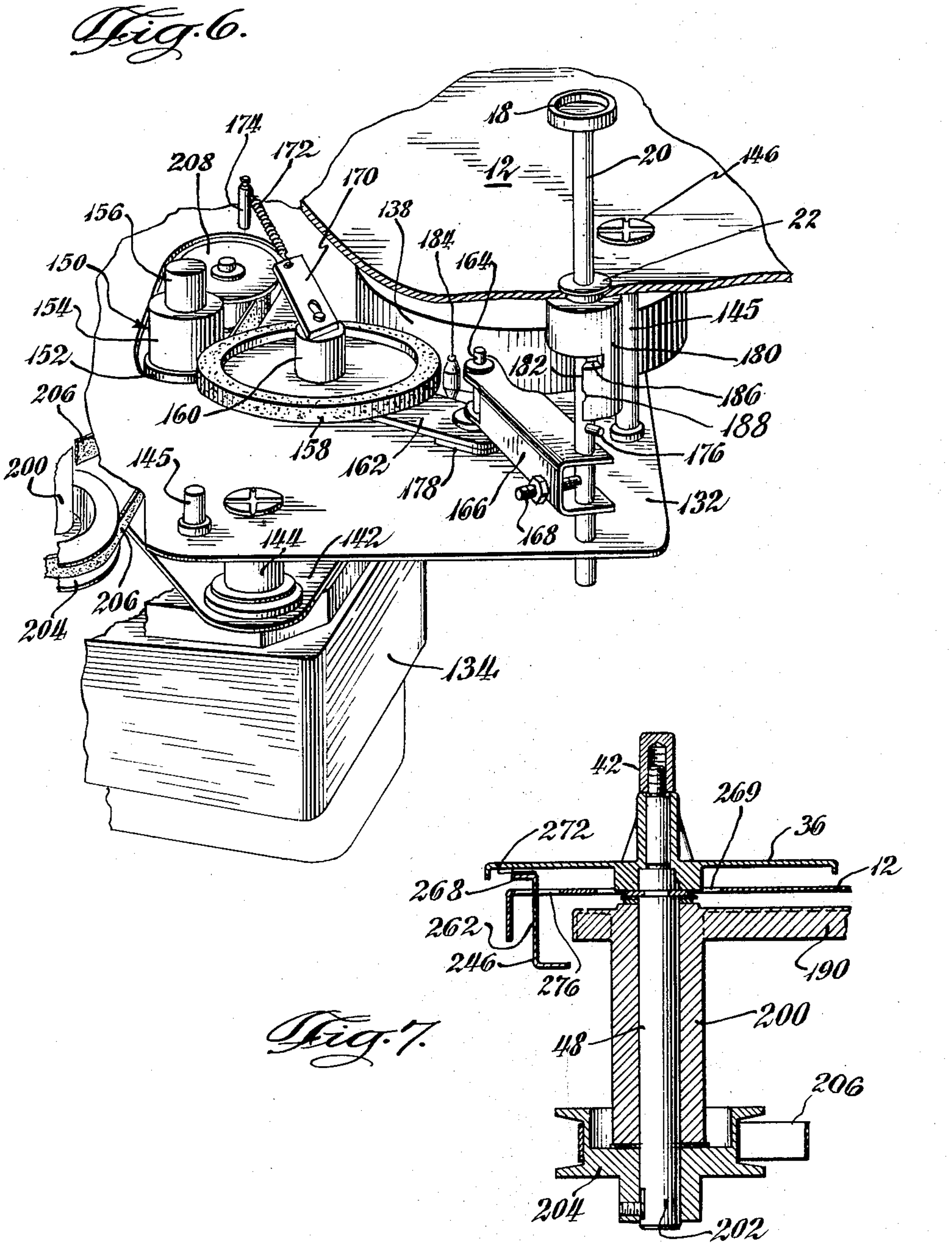
Fig. 6 is a fragmentary perspective view showing details of the speed change means.
Fig. 7 is a sectional view taken generally along the line 7—7 of Fig. 3 and in the direction indicated.

The motor shaft 148 (Fig. 6) mounts a three-step drive capstan 150 the largest diameter part 152 of which is closest to the motor 134 and located between the motor plate 142 and the sub-chassis 132. The intermediate diameter portion 154 extends above the sub-chassis 132 and the smallest diameter portion 156 is above that. An idler wheel 158, of rubber or other resilient material, at least on its circumference, is adapted to be urged into engagement between the flywheel 138 and one or the other of the capstan parts 154 and 156 so that the drive capstan 120 is driven at either a slow or a fast speed through this engagement. Manipulation of the knob 18 permits change of speed from one to the other at any time, as will be explained.

The idler wheel 158 is mounted on a shaft 160 which is free to rotate on the end of a lever 162 which in turn is pivoted on pin 164 mounted on the free end of a channel arm 166. The opposite end of the arm is secured to the bottom of the shaft 20 by a set screw 168 so that twisting the knob 18 results in pulling the idler wheel out from between the flywheel 138 and the drive capstan 150. The idler is urged to oppose this movement by a clip 170 which engages the end of the shaft 160 and is secured to a coil spring 172, the end of which is mounted on a post 174 attached to the sub-chassis 132.

The shaft 20 has a transverse pin 176 which prevents the shaft 20 from being raised in an axial direction without first twisting the same to prevent interference between the idler 158 and the drive capstan 150. When the shaft 20 is axially downward its fullest extent, the bottom of the lever 162 which is padded at 178 is against the sub-chassis 132. The shaft 20 is mounted on a bushing 180 which is shaped to provide a bearing surface 182 upon which the pin 176 can ride while the shaft 20 is moved axially. The limits of rotation of the shaft 20 are set by the engagement of the idler wheel 158 between drive capstan 150 and flywheel 138 and by the engagement of the idler wheel with a stop pin 184 set in the chassis 132 in the path of the idler wheel when it is moved out of engagement with the rotating members. The upper end of the bearing surface 182 terminates in a circumferential slot 186 into which the pin 176 will enter when the idler wheel 158 is engaged against the narrow part 156 of the drive capstan 150 so that in attempting to move the shaft 20 axially downward as required to the speed of the capstan 120 the shaft 20 must first be rotated a sufficient amount to bring the pin 176 out of the slot 186. This in turn moves the idler wheel 158 a sufficient distance away from the drive capstan 150 so that it clears the shoulder formed between the portions 154 and 156 and eliminates interference during speed changes. The intermediate notch 188 is a position of the pin 176 wherein the idler wheel 158 provides no connection between flywheel 138 and drive capstan 150.

In utilizing the tape transporting device 10, several requirements call for rotation of the spindles 40 and 48. Upon recording or reproducing, the spindle 48 is required to rotate at a speed faster than the speed of tape in moving between the pressure roller 122 and the drive capstan 120 in order to take up the tape and prevent spill-over. Under these circumstances the spindle 40 should idle, but should stop immediately if the recording or reproducing is stopped. This, of course, requires braking. Upon winding forward, without driving the tape by the drive capstan 120, the take-up spindle 48 is again required to rotate and the spindle 40 idle, with braking to prevent spill-over when the forward winding is stopped. In the event of re-wind, the reverse conditions prevail, that is, the spindle 40 is required to rotate in an opposite direction and the spindle 48 idle, with braking when the re-winding stops.

which is carried on slide plate 126. Slide plate 126 is urged downward and to the left as viewed in Fig. 3, along the line of the slot 286 which straddles a pin 288 and is confined by guide washers 290. Pin 288 and washers 290 are mounted to the bottom surface of the plate 12. Bias is obtained by a spring 292 which extends from a post 294 on the slide plate 126 to a ring 296 mounted on one of the spacers 145. The arm 284 has a camming edge 298 which engages a depending pin 300 on the slide plate 126. When the cam 240 rotates slightly in a counterclockwise direction as viewed in Fig. 3, the spring 292 pulls the slide plate 126 up the slot 286, thereby causing the roller 122 to engage against the drive capstan 120.

(3) A pressure pad assemblage 302 consisting of a cross arm 304 carrying right and left pressure pads 306 is pivotally mounted at 308 to a pin 309 carried by a swinging arm 310 which in turn is pivoted at 312 to the top of the plate 12, with the bottom of the pin 309 extending through a slot 314. A spring 316 extends between the bottom of the pin 309 and a post 318 secured to the bottom of the plate 12, tending to pull the arm 310 in such a direction to bring the pads 306 against the pole pieces 116 and 118. This movement is prevented by the interposition of a rocking lever 320 pivoted at 322 engaged behind the lower end of the shaft 124 and hence following the shaft. Obviously, the movement of the pressure roller 122 against the drive capstan 120 will be accompanied by the engagement of the pressure pads 306 against the pole pieces 116 and 118 whereby to tightly press the tape 34 thereagainst.

(4) Another rocking lever 324 is pivoted at 326 and has an adjustable end arm 328 carrying a boot 330 arranged to press against the left hand end of the equalizer bar 190. This movement is urged by a spring 332 mounted to the ring 296 and secured to a post 334, but opposed by the corner 336 of the slide plate 126. Movement of the slide plate 126 in bringing the pressure roller 122 against the drive capstan 120 and the pressure pads 306 to bear against the pole pieces will thus also serve to cause the boot 330 to press against the equalizer bar 190 at the left end thereof. By proper adjustment of the boot arm 328, this latter condition can be caused sufficiently to tighten the belt 206 to rotate the spindle 48 while the tape 44 is being driven past the heads 104 and 106. Slight play and flexibility in the various associated parts readily permit of this. Since the circumferential speed of the spindle 48 will be slightly greater than the speed of the tape while being transported past the heads, the tape is under continuous tension and will be neatly wound upon the take up reel 38. Slippage of the belt 206 will compensate for the difference in speed of the tape to prevent breakage, but firmly and neatly take up the tape upon the reel.

Obviously other functions are required to be accomplished, such as electrically connecting the additional components of the apparatus needed for reproducing or recording when the control knob 24 is operated, but these are no part of the invention. The necessary electrical switching or the like can easily be worked into the apparatus as described. Speed changing also may be accompanied by suitable compensation of the amplification, as stated above.

Means need be provided for connecting the heads electrically into the circuit of the additional apparatus, and a connector for this purpose is shown at 338, but any similar means is suitable.

It is believed that the invention and all of its features have been fully explained such as to enable those skilled in this art to understand and appreciate the advance made in providing a simple and fool-proof tape transporting mechanism of efficient operation, without the need for further details. The novel structures used for accomplishing the functions described are believed fully set forth, but it is desired to emphasize that the explanation is merely illustrative, since considerable variation in the arrangement of the parts, their sizes, shapes and proportions can be made without departing from the spirit or scope of the invention as set forth in the appended claims.

I claim as my invention:

1. In a tape transporting mechanism in which a ribbon-like recording medium is adapted to be transported past an electromagnetic head, and there being take-up means and feed means with the medium extending between the take-up and feed means, rotating drive means, friction means for pressing the medium against the rotating drive means to cause transportation of the tape, the medium being threaded between the friction and drive means, a source of rotative power and coupling means operable to couple said source with the drive means, take-up means, or feed means, and control means for selectively accomplishing said coupling, the improvement which comprises: a rigid pivotal elongate equalizer bar mounting said take-up means and feed means on respective opposite ends thereof, the coupling means between the source and the take-up means including a first belt rendered loose or tight with pivoting of the equalizer bar in one direction or the other, and the coupling between the source and feed means including a second belt rendered tight or loose with pivoting of the equalizer bar as aforesaid, there being a neutral condition of said equalizer bar at which both belts are loose, and control means for pivoting said equalizer bar in one direction to cause driven rotation of the take-up means and idling rotation of the feed means, or in the other direction to cause driven rotation of the feed means and idling rotation of the take-up means, first and second braking means associated with the take-up means and feed means respectively, a first linkage between said control means and first braking means, a second linkage between said control means and second braking means, and a rocking member actuated by said control means and engaging with said linkages, the control means having a neutral condition in which the rocking member is moved to cause both braking means to be rendered operative, and a second condition in which both braking means are rendered inoperative, said control means including a movable arm having a center position and three positions to which it can be moved from said center position, one position being for take-up of said recording medium, a second position being for re-winding of said recording medium and the third position being for recording upon or reproducing from said recording medium, the neutral condition existing when the arm is in center position, and the said second condition existing when the arm is in any of said three other positions, a pressure lever being provided normally inoperative, but biased to independently tighten the first belt when said arm is moved from central to said third position, a slide member carrying said friction means and being slidable to so engage said friction means against said drive means, the said pressure lever being engaged with said slide member and movable therewith.

2. A structure as claimed in claim 1 in which said pressure lever is adapted to press against an end of said equalizer bar to slightly rotate the same in tightening said first belt, and there being sufficient play to permit such tightening without substantial pivoting of said equalizer bar.

3. In a tape transporting mechanism in which a ribbon-like recording medium is adapted to be transported past an electromagnetic head, and there being take-up means and feed means with the medium extending between the take-up and feed means, rotating drive means, friction means for pressing the medium against the rotating drive means to cause transportation of the tape, the medium being threaded between the friction and drive means, a source of rotative power and coupling means operable to couple said source with the drive means, take-up means, or feed means, and control means for selectively accomplishing said coupling, the improvement which comprises: a rigid pivotal elongate equalizer bar mounting said take- Upon winding forward or during reproduction or recording, the spindle 48 and its reel rest 36 rotate in a clockwise direction viewed from the top of the device 10. During re-winding, the spindle 40 and its reel rest 44 rotate in a counterclockwise directions.

The spindles 40 and 48 are journalled in an elongate equalizer bar 190 at opposite ends thereof. The equalizer bar 190 is mounted on a pivot previously mentioned and designated 54 which in turn is journalled in a bearing 192 which depends from the center of the equalizer bar 190. The equalizer bar 190 is disposed below the plate 12 at the rear thereof, and spaced therefrom by means of a spacer or washer 193. The spindle 40 is journalled in the right hand end (see Fig. 3) in any suitable manner and a small pulley 194 is mounted to the spindle below the equalizer bar, being spaced below the plate 12 a distance sufficient to place same substantially at the level of the pulley 140 which is secured for rotation with the capstan 120. 196 is a spacer between the pulley 140 and the bushing or bearing means 130.

A belt 198 extends between the pulleys 140 and 194 such that rotation of the flywheel 138 will cause rotation of the reel rest 44, providing there is sufficient tension in the belt.

At the left hand end of the equalizer bar 190 there is an integral depending bushing or bearing 200 (Fig. 7) and the spindle 48 extends through bushing 20 and is journalled therein. A portion 202 of the spindle 48 extends from the bottom of the bushing 200 and to this end is secured a pulley 204 on a level with the large diameter portion 152 of the motor drive capstan 150. A belt 206 drives the spindle 48 if sufficiently tensioned. It will be noted in Figs. 4 and 6 that a pulley 208 is journalled on the motor plate 142 and the belt 206 passes around the pulley 208 and engages the large diameter portion 152 of the drive capstan 150. Note that both reaches of the belt 206 pass on the same side of the large diameter portion 152.

The equalizer bar is rocked one way or the other, to apply tension to the belt 198 or the belt 206, in which case one or the other of the spindles will rotate to wind or rewind the tape as the case may be. In rocking the equalizer bar, the pressure roller 122 and the capstan 120 remain spaced apart. Rocking is accomplished by means of a tie bar 210, one end 212 of which is threaded and extends through a depending ear 214 integral with the equalizer bar 190 and is adjustably held in position by means of spacers 216 and nuts 218 on opposite sides of the ear 214. The other end 220 of the tie bar 210 has an upwardly directed right angle bend therein and the free end 222 is slidably engaged by means of suitable washers and the like in an S-shaped slot 224 of a slidable plate termed the wind and rewind slide plate 226 and in a short slot 228 formed in the plate 12. The rectangular opening 64 permits clearance for the end 222. The wind and rewind slide plate 226 slides right and left in engagement with the bottom face of the chassis plate 12 and is confined in this movement by washers 230 on rivet 232 straddling and sliding in slot 234 at one end of the plate 226. The opposite end of the slide plate 226 has an open ended slot 236 which is engaged by rivet 238 which also serves as a pivot for another plate termed the play and record control cam 240, and hence the slide plate and cam are sandwiched between the bottom surface of the chassis plate 12 and the washer 242.

It will be recalled that the movement of the control knob 24 also moved the control shaft 80, the bottom end ball bearing 86 of which rides on the large leaf spring 88. Generally F-shaped brake arms 244 and 246 are rockably mounted on stand-off brackets 248 riveted to the bottom of the chassis plate 12. This is done in any suitable manner, such as for example by providing the brackets with ears depending from the bottom of the plate 12 and loosely engaging slots in the arms. Leaf springs 249 held in place by screws 250 assisted by leaf springs 247 urge the right angle extensions 252 and 254 upward so that the foot screws 256 and 258 press against the leaf spring 88 as shown in Fig. 5. The opposite ends of the arms 244 and 246 have upwardly extending lugs 260 and 262 which have their uppermost ends 264 and 268 bent over and provided with friction brake shoes 270 and 272 respectively.

The chassis plate 12 is provided with openings 274 and 276 through which the lugs 260 and 262 respectively extend into positions adapted to engage the bottoms respectively of the reel rests 44 and 36 respectively. The foot screws 256 and 258 may be adjusted for proper throw of the brake shoes 270 and 272 when the control knob is moved. The brake shoes are adjusted to bear against the bottoms of the reel rests when the control knob is upright, that is when the knob 24 is erect. Thus, regardless of the position to which the knob 24 is moved, it will permit upward swinging of the leaf spring 88 and release of the brake shoes, and when it is returned to neutral position, both brake shoes will prevent rotation of the reel rests.

Since the leaf spring 88 can be pivoted right and left, an important function making for efficient operation can be accomplished. Presume that the control knob is moved to the right, and is thus in rewind position. The spindle 40 is now rotating counter-clockwise and the brake arms are both permitted to rock upward to release the brakes from both reel rests. Now in returning the knob 24 back to neutral position, since the shaft 80 presses the left hand side of the spring 88 downward first, the extension 254 will be pushed downward and the brake shoe 272 will contact the bottom of the take-up reel rest 36 before the extension 252 is pushed downward to cause contact between the brake shoe 270 with the rewind reel rest 44. This prevents spill-over of the tape, since the free running reel 38 is braked before the driven reel 46 is stopped and itself braked. The reverse holds true for forward winding, and there is no need to explain the operation of the braking means therefor. In moving from play or record position to neutral, the reel rests are simultaneously braked.

It should be obvious that moving the control knob 24 right or left will cause the free end 222 of the tie bar 210 to move from a centered position in the slots 224 and 228 either forward or backward into either end of the S-shaped slot 224 to rock the equalizer bar 190. The shaft 88 engages in a transverse slot 278 (Fig. 3) in the wind and rewind slide plate 226 so that the control knob 24 may be moved right and left and will thereby slide the plate 226 right and left, but movement of the knob 24 forward as in putting the mechanism 10 into play or record condition will have no effect. As a matter of fact, since the chassis plate 12 has a T-shaped slot 82 therein, positioned so that the center leg 84 of the T is aligned with the shaft 80 when it is in neutral erect position, the control knob 24 can only be pulled forward from this neutral position.

In causing engagement between the pulleys 194 and 204 and their respective belts, the equalizer bar 190 is rocked, and to provide sufficient clearance for the spindles, etc. the plate 12 has generally oval shaped slots 269 and 271 through which the spindles extend.

Figure 3:
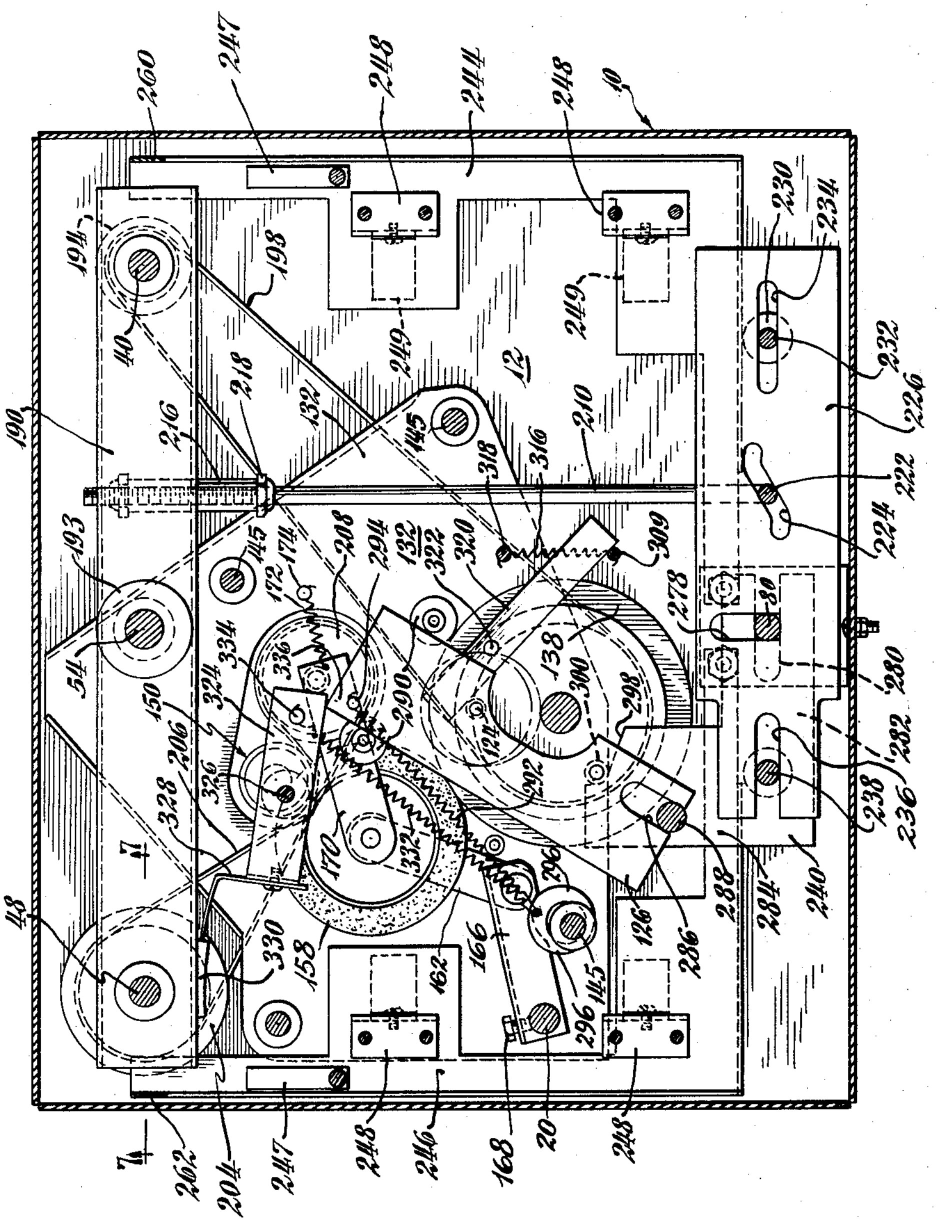
Fig. 3 is a sectional view taken through the tape transporting mechanism on a horizontal plane just below the chassis panel or mechanism plate, looking down.
Figure 4:
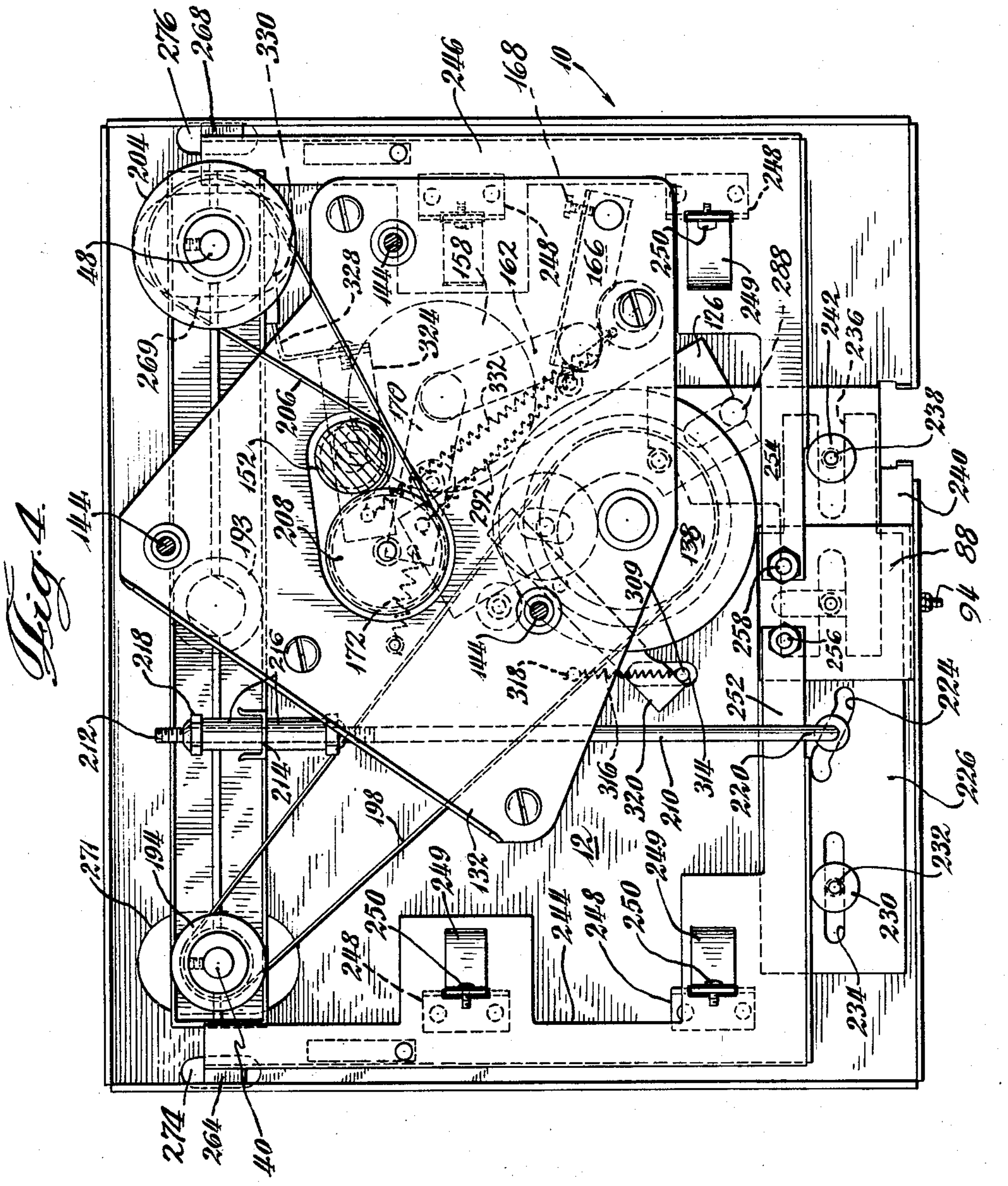
Fig. 4 is a bottom plan view of the mechanism, with portions being shown in section.

In moving the control knob 24 for forward to record or reproduce position, several functions occur. These may be enumerated for clarity:

(1) Looking at Fig. 3 which is a top view of the mechanism just below the chassis plate 12, the play and record control cam 240 pivots around the rivet 238 in a counter-clockwise direction because the shaft 80 is engaged in the slot 280. The cam 240 is generally L-shaped and has one arm 282 parallel with the slide plate 226 and the other 284 at right angles, extending rearward of the mechanism 10.

(2) The pressure roller 122 is mounted to a shaft 124 up means and feed means on respective opposite ends thereof, the coupling means between the source and the take-up means including a first belt rendered loose or tight with pivoting of the equalizer bar in one direction or the other, and the coupling between the source and feed means including a second belt rendered tight or loose with pivoting of the equalizer bar as aforesaid, there being a neutral condition of said equalizer bar at which both belts are loose, and control means for pivoting said equalizer bar in one direction to cause driven rotation of the take-up means and idling rotation of the feed means, or in the other direction to cause driven rotation of the feed means and idling rotation of the take-up means, said control means comprising a lever having a neutral position and first and second positions on opposite sides respectively of neutral, spring-pressed detent means for all positions, a tie-bar linked with said equalizer bar, and a camming connection between said lever and tie-bar whereby movement of the lever will pivot said equalizer bar, said camming connection including a rectilinear slot fixed relative the pivotal axis of the equalizer bar, a slide having a generally S-shaped slot overlying the rectilinear slot, a part of the tie-bar being engaged in both slots, and the lever having a shaft engaged with the slide to move the same in a direction transverse of the rectilinear slot whereby cooperation between the S-shaped slot, rectilinear slot, and tie-bar will result in axial translation of the tie-bar.

4. A structure as claimed in claim 3 in which said mechanism includes a support plate mounting the same, the rectilinear slot being formed in said plate, and the equalizer bar being pivotally secured to said plate, a ball and socket connection secured to said plate and said lever being secured to said ball above the connection with said shaft secured to said ball below the connection, the connection being spaced above the plate and the plate having a T-shaped slot with the shaft engaged in the slot at the meeting of the cross-arm and central leg portions of the T-shaped slot when the lever is in neutral position, and the first and second positions being achieved by moving the lever to bring the shaft to one end or the other of the cross arm of said T-shaped slot.

5. A structure as claimed in claim 3 in which said mechanism includes a support plate mounting the same, the rectilinear slot being formed in said plate, and the equalizer bar being pivotally secured to said plate, a ball and socket connection secured to said plate and said lever being secured to said ball above the connection with said shaft secured to said ball below the connection, the connection being spaced above the plate and the plate having a T-shaped slot with the shaft engaged in the slot at the meeting of the cross-arm and central leg portions of the T-shaped slot when the lever is in neutral position, and the first and second positions being achieved by moving the lever to bring the shaft to one end or the other of the cross arm of said T-shaped slot, a cam member pivoted to said plate and having a slot therein substantially congruent with the cross arm of said T-shaped slot whereby said shaft engages the same and can pivot the same only during movement of the lever to said third position, the carrier plate supporting said friction means and normally biased to move in a direction carrying the friction means against the rotating drive means, but prevented from doing so by said cam member, whereby upon movement of said shaft into the central leg portion of said T-shaped slot, the cam member will be rotated to permit movement of said carrier plate, and subsequent engagement of the recording medium between friction and rotating drive means.

6. A structure as described in claim 5 in which the slide has a second rectilinear slot parallel to the first-mentioned rectilinear slot, and the said shaft is engaged in said second rectilinear slot, but movable from one end or the other only when the lever is in neutral position and the rectilinear slot is congruent with the center leg of the T-shaped slot.

7. In a tape transporting mechanism in which there is a chassis having a source of rotation mounted thereon driving a power capstan, a tape transporting capstan and a driven wheel connected to drive the capstan and mounted on said chassis with its axis parallel with and spaced from the axis of the power capstan, an idler wheel adapted to be engaged between the power capstan and the driven wheel for transferring the rotation of the power capstan to the tape transporting capstan, a translatable arm mounting said idler wheel, means urging said arm to move in one direction to press said idler wheel into engagement between the power capstan and driven wheel, and a manually movable lever for moving said arm in the opposite direction, said manually movable lever being mounted on a shaft whose axis is parallel with the axis of the driven wheel and power capstan, said shaft having a part extending out of the chassis to enable manipulation thereof, and said arm being pivotally secured to the lever spaced from said shaft so that rotation of the shaft will translate the arm away from said driven wheel and power capstan.

8. A structure as claimed in claim 7 in which the power capstan has at least two parts of different diameter and the shaft is movable axially whereby the lever, arm and idler wheel can be axially moved to cause engagement between said driven wheel and a predetermined one of said parts to cause said transporting capstan to rotate at different speeds.

9. A structure as claimed in claim 8 in which said chassis has a bushing and said shaft is journalled in said bushing, and said shaft and bushing have guide and follower means for preventing interference between said idler wheel and parts as the idler wheel is moved axially.

10. A structure as claimed in claim 8 in which said chassis has a bushing and said shaft is journalled in said bushing, and said shaft and bushing have guide and follower means for preventing interference between said idler wheel and parts as the idler wheel is moved axially, said follower means comprising a pin, and said guide means comprising an axially extending bearing surface having at least a circumferential slot engaged by the pin when the idler wheel is engaged against a small diameter part, whereby in order to move the idler wheel axially to said larger diameter part the shaft must be rotated to bring the said pin out of said slot, said last mentioned rotation serving to translate the said arm a sufficient amount for the idler wheel to clear the larger diameter part such that subsequent axial movement of the shaft is without interference.

11. In a structure of the character described, the combination with a chassis of an equalizer bar having a take-up spindle on one end, a feed spindle on the other end, a pivot on the chassis mounting the equalizer bar, a T-shaped slot in the chassis, a control lever having a dependent follower engaged in the chassis and having a universal connection with the chassis spaced above the T-shaped slot, a slide member arranged generally parallel with the equalizer bar and having a link extending between the slide member and the equalizer bar, the follower being engaged to drive the slide member when moved into one end or the other of the cross arm of the T-shaped slot, a cam connection between the slide member and link such that sliding movement of the slide member will pivot the equalizer bar, a motor having rotative connection with the said spindles and including a belt engaging each spindle, the belts being alternately loose or tight with movement of said equalizer bar, but both loose when said follower is in the center of said T-shaped slot between the ends of the cross arm, a drive capstan rotative with the motor, an idler pressure roller adapted to be moved into engagement with the drive capstan, a second slide member mounted on said chassis and carrying said pressure roller and being normally biased to slide in a direction carrying the pressure roller into engagement with the drive capstan, but said chassis having a cam member blocking said movement, the cam member adapted to be moved by the said follower but only when the follower is moved into the central leg of the T-shaped slot, whereby movement of the follower into one of the ends of the cross arm will cause rotation of one of the spindles and idling of the other, and movement of the follower into the end of the central leg will cause engagement between the pressure roller and the drive capstan, said movements being mutually exclusive.

12. A structure as claimed in claim 11 in which the chassis has tape pressure pad means and a head thereon and the pressure pad means is adapted to be moved to press a tape against the head, an arm carrying the pad means and biased to so press the tape but there being a pad moving lever disposed in the path of said arm and engaged by said second slide member whereby upon movement of said second slide member to bring the pressure roller into engagement with the drive capstan, the pressure pad means will be permitted to move against the head.

13. A structure as claimed in claim 11 in which there are means for pressing the equalizer bar to tighten the belt engaging the take-up spindle to cause rotation of the same without substantial pivoting of the equalizer bar, there being sufficient play to provide for this, and said pressing means are normally prevented from operating by said second slide member, but rendered operative upon movement of the said second slide member.

14. A structure as claimed in claim 13 in which the pressing means includes an arm adjustable relative the equalizer bar for adjusting the take-up slippage while the drive capstan drives the tape.

References Cited in the file of this patent

UNITED STATES PATENTS

| | | |
|---|---|---|
| 2,069,595 | Thomas | Feb. 2, 1937 |
| 2,215,468 | Herzig | Sept. 24, 1940 |
| 2,408,320 | Kuhlik | Sept. 24, 1946 |
| 2,650,504 | Tateishi | Sept. 1, 1953 |
| 2,694,577 | Ninni | Nov. 16, 1954 |
| 2,705,262 | Post et al. | Mar. 29, 1955 |
| 2,712,448 | Schroter | July 5, 1955 |